(12) United States Patent
Klemetti et al.

(10) Patent No.: US 8,635,909 B2
(45) Date of Patent: *Jan. 28, 2014

(54) VIBRATING MICROMECHANICAL SENSOR OF ANGULAR VELOCITY

(75) Inventors: Petri Klemetti, Klaukkala (FI); Kaisa Nera, Helsinki (FI); Antti Lipsanen, Espoo (FI); Anssi Blomqvist, Helsinki (FI); Altti Torkkeli, Tuusula (FI)

(73) Assignee: Murata Electronics Oy, Vantaa (FI)

( * ) Notice: Subject to any disclaimer, the term of this patent is extended or adjusted under 35 U.S.C. 154(b) by 128 days.

This patent is subject to a terminal disclaimer.

(21) Appl. No.: 13/328,429

(22) Filed: Dec. 16, 2011

(65) Prior Publication Data

US 2012/0085167 A1 Apr. 12, 2012

Related U.S. Application Data

(63) Continuation of application No. 12/285,406, filed on Oct. 3, 2008, now Pat. No. 8,104,343.

(30) Foreign Application Priority Data

Oct. 5, 2007 (FI) ...................................... 20075708

(51) Int. Cl.
*G01P 15/08* (2006.01)
*G01C 19/00* (2013.01)
(52) U.S. Cl.
USPC ...................................................... 73/504.12
(58) Field of Classification Search
USPC ............................................ 73/504.12–504.16
See application file for complete search history.

(56) References Cited

U.S. PATENT DOCUMENTS

| | | | |
|---|---|---|---|
| 6,571,630 B1 | 6/2003 | Weinberg et al. | |
| 7,630,869 B2 | 12/2009 | Shen et al. | |
| 7,950,381 B2 | 5/2011 | Maeda | |
| 8,104,343 B2 * | 1/2012 | Klemetti et al. | 73/504.12 |
| 8,176,779 B2 * | 5/2012 | Blomqvist | 73/504.12 |
| 2003/0061877 A1 | 4/2003 | Stewart et al. | |
| 2003/0159510 A1 | 8/2003 | Stewart et al. | |
| 2003/0200807 A1 | 10/2003 | Hulsing, II | |

(Continued)

FOREIGN PATENT DOCUMENTS

| | | |
|---|---|---|
| EP | 1744121 | 1/2007 |
| RU | 2162229 | 1/2001 |

OTHER PUBLICATIONS

International Search Report PCT/FI2008/050539 filed Sep. 29, 2008.
Extended European Search Report Dated Jun. 27, 2012.

(Continued)

*Primary Examiner* — Max Noori
(74) *Attorney, Agent, or Firm* — Squire Sanders (US) LLP

(57) ABSTRACT

The invention relates to measuring devices to be used in the measuring of angular velocity and, more precisely, to vibrating micromechanical sensors of angular velocity. In a sensor of angular velocity according to the invention, a mass is supported to the frame of the sensor component by means of an asymmetrical spring structure (1), (2), (3), (4), (22), (24) in such a way, that the coupling from one mode of motion to another, conveyed by the spring (1), (2), (3), (4), (22), (24), cancels or alleviates the coupling caused by the non-ideality due to the skewness in the springs or in their support. The structure of the sensor of angular velocity according to the invention enables reliable measuring with good performance, particularly in small vibrating micromechanical solutions for sensors of angular velocity.

20 Claims, 7 Drawing Sheets

(56) References Cited

U.S. PATENT DOCUMENTS

| | | |
|---|---|---|
| 2004/0206176 A1 | 10/2004 | Willig et al. |
| 2006/0156814 A1 | 7/2006 | Blomqvist |
| 2008/0314144 A1 | 12/2008 | Blomqvist |
| 2009/0223276 A1 | 9/2009 | Rudolf et al. |
| 2010/0218605 A1* | 9/2010 | Blomqvist et al. ......... 73/504.12 |
| 2012/0247213 A1* | 10/2012 | Zumberge et al. ............. 73/653 |

OTHER PUBLICATIONS

Petri Klemetti et al., U.S. Appl. No. 13/328,453, filed Dec. 16, 2011.

* cited by examiner

VIBRATING MICROMECHANICAL SENSOR OF ANGULAR VELOCITY

CROSS-REFERENCE TO RELATED APPLICATIONS

This is a continuation application of U.S. patent application Ser. No. 12/285,406, filed on Oct. 3, 2008. The disclosure of the prior application(s) is hereby incorporated by reference in its entirety.

FIELD OF THE INVENTION

The invention relates to measuring devices to be used for measuring angular velocity and, more precisely, to vibrating micromechanical sensors of angular velocity. The object of the invention is to provide an improved sensor structure enabling reliable measuring with good performance, particularly in small size vibrating micromechanical solutions for sensors of angular velocity.

BACKGROUND OF THE INVENTION

In measuring angular velocity, the principle of the method of measuring based on a vibrating sensor of angular velocity has proved to be simple and reliable. In a vibrating sensor of angular velocity, a certain known primary motion is induced and maintained in the sensor. The desired motion to be measured by means of the sensor is then detected as a deviation of the primary motion.

An external angular velocity in a direction perpendicular to the resonators' direction of motion acting on the sensor induces a Coriolis force in the seismic mass in a direction perpendicular to its direction of motion. The Coriolis force, proportional to the angular velocity, is detected, for example capacitively, in the vibration of the mass.

One of the most significant problems in micromechanical vibrating sensors of angular velocity is the so called quadrature signal, which is caused by poor dimensional precision in the structures. In resonators manufactured using the means of micromechanics, there may be found tolerance errors in the perpendicularity of the directions of motion, which in the detection of the sensor of angular velocity cause a signal, called the quadrature signal, of a magnitude, at worst, hundreds of times larger than the angular velocity signal corresponding to the maximum value of the output scale.

The angular velocity signal to be measured, being proportional to the speed of the mass, is luckily phase-shifted by 90 degrees in relation to the quadrature signal, whereby the quadrature signal disappears in an ideal demodulation. However, being significantly larger than the signal to be measured, it restricts the dynamics of the signal. Another big disadvantage of the quadrature signal is, that it, if left uncompensated for, significantly degrades the stability of the zero point of the sensor, due to phase shifts in the electronic signals as, for example, the temperature changes.

In the sensor, the quadrature signal can be compensated for by using electric forces. One of the known techniques is i.a. feed-forward compensation, in which a force modulated by the detected primary motion is fed back into the detecting resonator at a phase opposite to the quadrature signal. Alternative ways of electrical compensation include, for example, straightening of the direction of motion by a static electric force or by a force generated by a static entity modulated by the motion, which force compensates for the quadrature signal caused by a residual of the spring force.

Compensation by means of electric forces constitutes a challenge to the sensor's electronics. What is required is either accurate phase control or, possibly, large voltages and separate structures within the sensor.

Thus, the object of the invention is to provide a structure of a vibrating sensor of angular velocity, in which the compensation for the quadrature signal is implemented directly by mechanical design, without electric forces.

Referring to prior art, the Finnish patent publication FI-116543B1 describes a sensor of angular velocity according to prior art, where the seismic masses are connected to support areas by springs and/or stiff auxiliary structures, which give the masses a degree of freedom in relation to an axis of rotation perpendicular to the plane of the disk they are forming, and to at least one axis of rotation extending in the direction of the plane of the disk.

Further, referring to prior art, the Finnish patent publication FI-116544B1 describes a sensor of angular velocity according to prior art, where at least one pair of electrodes is formed in association with the edge of the seismic mass, which pair of electrodes forms two capacitances with the surface of the mass, so that, as a function of the angle of rotation of the mass's primary motion, one capacitance of the pair of electrodes increases and the other capacitance of the pair of electrodes decreases.

SUMMARY OF THE INVENTION

The objective of the invention is to provide such an improved vibrating sensor of angular velocity, which enables reliable measuring with a good performance, particularly in solutions with a small vibrating sensor of angular velocity, and in which the compensation for the quadrature signal is implemented by mechanical design without electric compensation, or, alternatively, in combination with the electric compensation methods mentioned above.

According to a first aspect of the invention, a vibrating micromechanical sensor of angular velocity is provided, which comprises at least one seismic mass and, associated with the mass, a moving electrode, which mass possesses a primary motion, which is to be activated, and, in addition to the primary motion, at least one degree of freedom in relation to a detection axis, or detection axes, essentially perpendicular to the primary motion, and which mass, or which masses, is/are supported to the frame of the sensor component by means of a spring structure such, that the spring structure is asymmetric such, that the coupling, conveyed by the spring, from one mode of motion to another cancels or alleviates the coupling caused by non-ideality due to skewness of the springs or their support.

Preferably, one corner of the spring structure is etched off. Alternatively, one or more compensation groove is etched into the spring structure. Further, alternatively, one or more compensation cavity is etched into the spring structure. Further, alternatively, one or more compensation groove or compensation cavity is etched into at least one attachment spot for the spring structure. Further, preferably, the compensation grooves or the compensation cavities are suitably dimensioned such, that they effectively straighten the end portion of a skewed spring.

Alternatively, one edge of the spring structure is serrated. Alternatively, both edges of the spring structure are serrated. Further, preferably, the serration is suitably dimensioned to be one-sided or asymmetric such, that the serration twists the bending axis of the spring.

Preferably, the spring structure is designed to be asymmetric such, that the coupling from one mode of motion to another, conveyed by the spring, cancels or alleviates the coupling caused by non-ideality due to an inclination relative to the perpendicular to the disk of the groove of the DRIE etching process.

According to a second aspect of the invention, a method is provided for manufacturing, by means of micromechanical disk structures, a vibrating micromechanical sensor of angular velocity comprising at least one seismic mass and, in association with the mass, a moving electrode, which mass possesses a primary motion to be activated and, in addition to the primary motion, at least one degree of freedom in relation to a detection axis, or detection axes, essentially perpendicular to the primary motion, and which mass, or which masses, is/are supported to the frame of the sensor component by means of a spring structure such, that the spring structure of the sensor of angular velocity is made asymmetric by etching.

Preferably, the etching mask is designed such, that it compensates for non-idealities occurring over the surface of the disk, caused by the manufacturing process. Preferably the DRIE etching technique (DRIE, Deep Reactive Ion Etching) is used in the manufacturing. Preferably, in the manufacturing, non-idealities of the DRIE etching process are utilized, such as the ARDE effect (ARDE, Aspect Ratio Dependent Etch rate). Preferably, a two-stage DRIE etching process is utilized in the manufacturing, by means of which the depth of the etched groove or cavity can be suitably dimensioned.

BRIEF DESCRIPTION OF THE DRAWINGS

Below, the invention and its preferable embodiments are described in detail with exemplifying reference to the attached drawings, of which.

DETAILED DESCRIPTION OF THE INVENTION

Figure 1:
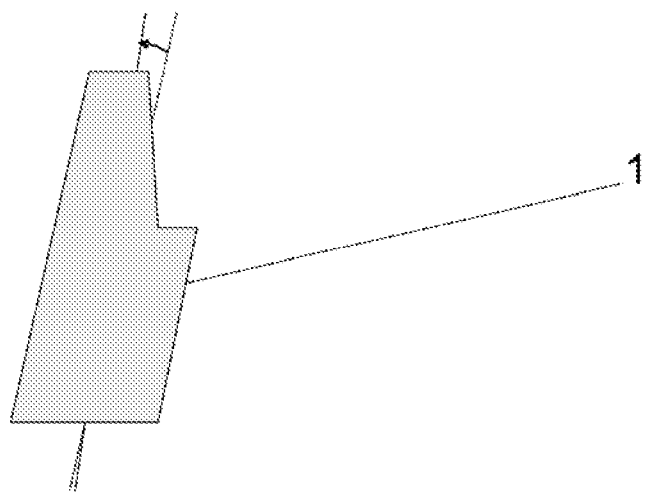
FIG. 1 shows a section through a spring structure used in supporting the seismic mass of a vibrating sensor of angular velocity according to the invention.

In a vibrating sensor of angular velocity according to the invention, the primary motion to be activated is the vibration of at least one seismic mass and an associated moving electrode. In addition to the primary motion, the seismic mass possesses another degree of freedom in relation to a detection axis essentially perpendicular to the primary motion.

Further, the sensor of angular velocity according to the invention comprises a seismic mass and an associated moving electrode, which mass is supported to the frame of the sensor component by means of a spring structure.

The moving electrode in the primary motion mode of the vibrating sensor of angular velocity according to the invention is activated into vibration. Thus, the coupling caused by the Coriolis force activates the detection motion mode. The motion axes of the primary motion mode and the detection motion mode, or the detection motion modes, are essentially perpendicular to each other. Due to the known non-ideality, there will be a coupling between the modes in the absence of angular velocity activation.

In one structure of a vibrating sensor of angular velocity according to the invention, the primary motion to be activated is the vibration of at least one seismic mass and an associated moving electrode. Correspondingly, the motion of the detection motion mode can then occur, for example, essentially in the plane of the disk. Alternatively, the motion of the detection motion mode can occur essentially perpendicularly to the plane of the disk.

The vibrating sensors of angular velocity according to the invention are typically manufactured by means of disk structures. Typically a multitude of structures of sensors of angular velocity are manufactured onto a central disk by means of, for instance, etching techniques, which central disk then, for example, is sealed by disks on top and underneath. The sensors of angular velocity are diced out of the finished disk package structure.

In sensors having the structure of vibrating sensors of angular velocity, manufactured by means of the DRIE etching technique (DRIE, Deep Reactive Ion Etching), in which sensors one mode of motion is in the plane of the disk and the other is perpendicular to the plane of the disk, the quadrature signal is caused by an inclination of the DRIE groove in relation to the normal to the disk. The phenomenon is well repeatable and its distribution over the disk is known.

Since the distribution over the disk is known, compensation, according to the invention, of the structures of the vibrating sensors of angular velocity can be implemented by means of the manufacturing mask, whereby there will be no need for individual mechanical tuning of the structures of the sensors of angular velocity.

The phenomenon causing the quadrature signal in the structure of the vibrating sensor of angular velocity according to the invention is a known one, such as, for example, the quadrature signal caused by the inclination of the DRIE etching process groove in relation to the normal to the disk, and thus the quadrature signal distribution over the disk is also known and repeatable.

In the solution according to the invention, the quadrature signal is compensated for by designing the springs to be asymmetrical such, that the coupling, conveyed by the springs, from one mode of motion to another cancels or significantly alleviates the coupling caused by the non-ideality due to the quadrature signal.

As a special case of the solution, a asymmetrical spring in the structure, according to the invention, of the vibrating sensor of angular velocity can be produced by using other non-idealities of the DRIE etching process. As examples of such non-idealities of the DRIE etching process, the ARDE effect (ARDE, Aspect Ratio Dependent Etch rate), and the wedge-like character of the profile, can be mentioned. Thus, compensation according to the invention is accomplished without any additional process steps.

The FIGS. 1 through 11 show examples of spring structures of the structure of the vibrating sensor of angular velocity according to the invention, by means of which spring structures the quadrature signal can be compensated for.

FIG. 1 shows a section through a spring structure used in supporting the seismic mass of a vibrating sensor of angular velocity according to the invention. The spring structure of the sensor of angular velocity according to the invention is depicted with the numeral 1. A corner of the spring structure 1 according to the invention is etched off. The spring structure according to the invention is asymmetrical such, that the coupling, conveyed by the spring, from one mode of motion to another cancels or significantly alleviates the coupling caused by non-ideality due to the quadrature signal.

Figure 2:
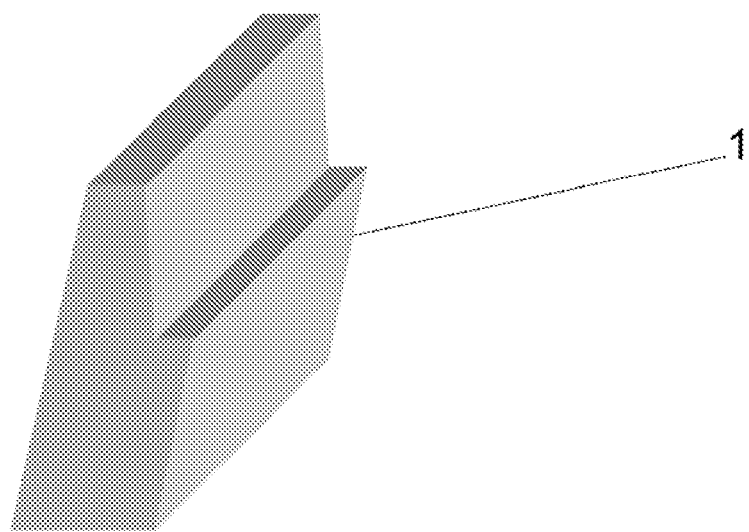
FIG. 2 shows a perspective view of the spring structure used in supporting the seismic mass of a vibrating sensor of angular velocity according to the invention.

FIG. 2 shows a perspective view of the spring structure used in supporting the seismic mass of a vibrating sensor of angular velocity according to the invention. The spring structure of the sensor of angular velocity according to the invention is depicted with by the numeral 1. A corner of the spring structure 1 according to the invention is etched off.

In manufacturing the spring structures according to the invention shown in FIGS. 1-2, the etching mask can be designed such that it compensates for non-idealities occurring over the disk caused by the manufacturing process. One of these non-idealities is, for example, the non-ideality caused by the inclination of the DRIE etching process groove in relation to the normal to the disk. Thus, the size of the cut-off corner of the spring structure 1 according to the invention varies over the disk.

Figure 3:
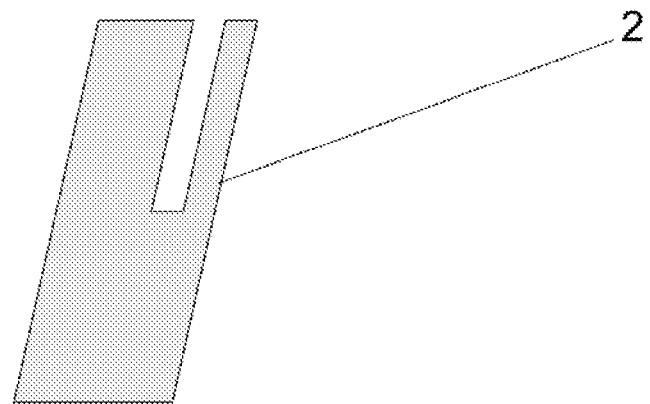
FIG. 3 shows a section through an alternative spring structure used in supporting the seismic mass of a vibrating sensor of angular velocity according to the invention.

FIG. 3 shows a section through an alternative spring structure used in supporting the seismic mass of a vibrating sensor of angular velocity according to the invention. The alternative spring structure of the sensor of angular velocity according to the invention is depicted with the numeral 2. One or more compensation grooves have been etched into the alternative spring structure 2 according to the invention. The alternative spring structure 2 according to the invention is asymmetrical such that the coupling, conveyed by the spring, from one mode of motion to another cancels or significantly alleviates the coupling caused by non-ideality due to the quadrature signal.

Figure 4:
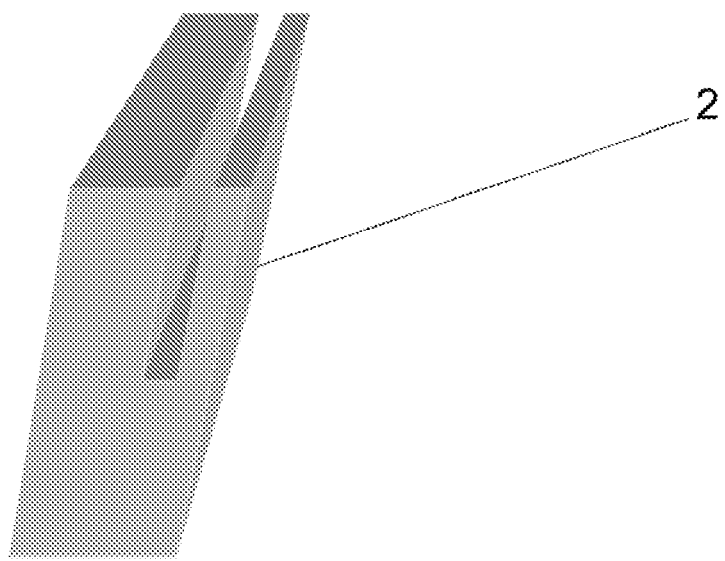
FIG. 4 shows a perspective view of the alternative spring structure used in supporting the seismic mass of a vibrating sensor of angular velocity according to the invention.

FIG. 4 shows a perspective view of the alternative spring structure used in supporting the seismic mass of a vibrating sensor of angular velocity according to the invention. The alternative spring structure of the sensor of angular velocity according to the invention is depicted with the numeral 2. One or more compensation grooves have been etched into the alternative spring structure 2 according to the invention.

In manufacturing the alternative spring structures according to the invention, shown in FIGS. 3-4, the etching mask can be designed such that it compensates for non-idealities occurring over the disk caused by the manufacturing process. One of these non-idealities is, for example, the non-ideality caused by the inclination of the DRIE etching process groove in relation to the normal to the disk. Thus, the dimensioning of the compensation groove of the alternative spring structure 2 according to the invention varies over the disk.

The compensation groove of the alternative spring structure 2 according to the invention can be etched in the same DRIE etching as the other structures. In manufacturing the alternative spring structures 2 according to the invention, due to the ARDE effect, the compensation groove would not be etched all the way through the disk, but rather, the depth of the groove can be suitably dimensioned. Alternatively, a groove of a suitable depth can, for example, be etched by means of a two-stage etching process.

Figure 5:
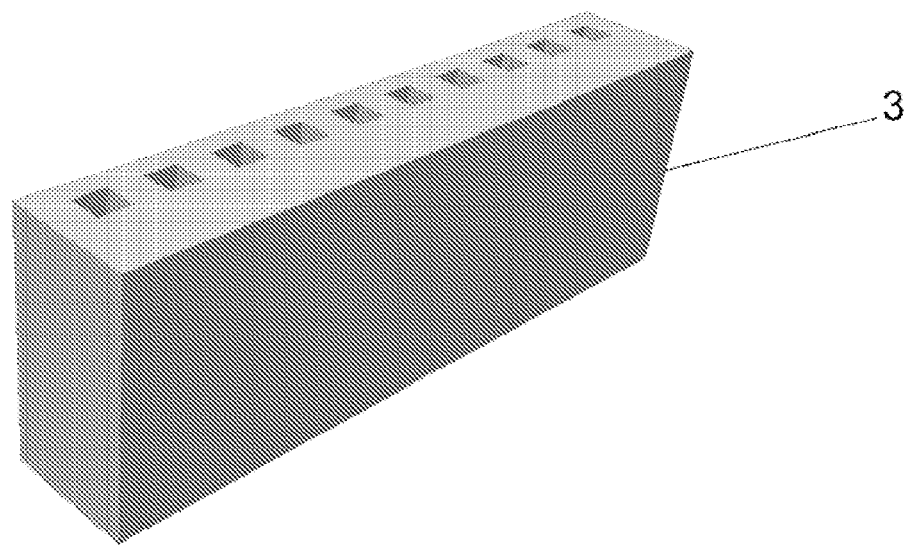
FIG. 5 shows a perspective view of a second alternative spring structure used in supporting the seismic mass of a vibrating sensor of angular velocity according to the invention.

FIG. 5 shows a perspective view of a second alternative spring structure used in supporting the seismic mass of a vibrating sensor of angular velocity according to the invention. The second alternative spring structure of the sensor of angular velocity according to the invention is depicted with the numeral 3. One or more compensation cavities have been etched into the second alternative spring structure 3 according to the invention. The second alternative spring structure 3 according to the invention is asymmetrical such that the coupling, conveyed by the spring, from one mode of motion to another cancels or significantly alleviates the coupling caused by non-ideality due to the quadrature signal.

In manufacturing the second alternative spring structure 3 according to the invention, shown in FIG. 5, the etching mask can be designed such that it compensates for non-idealities occurring over the disk caused by the manufacturing process. One of these non-idealities is, for example, the non-ideality caused by the inclination of the DRIE etching process groove in relation to the normal to the disk. Thus, the dimensioning of the compensation cavities of the second alternative spring structure 3 according to the invention varies over the disk.

The compensation cavities of the second alternative spring structure 3 according to the invention can be etched in the same DRIE etching as the other structures. In manufacturing the second alternative spring structures 3 according to the invention, due to the ARDE effect, the compensation cavities would not be etched all the way through the disk, but rather, the depth of the cavities can be suitably dimensioned. Alternatively, a groove of a suitable depth can, for example, be etched by means of a two-stage etching process.

Figure 6:
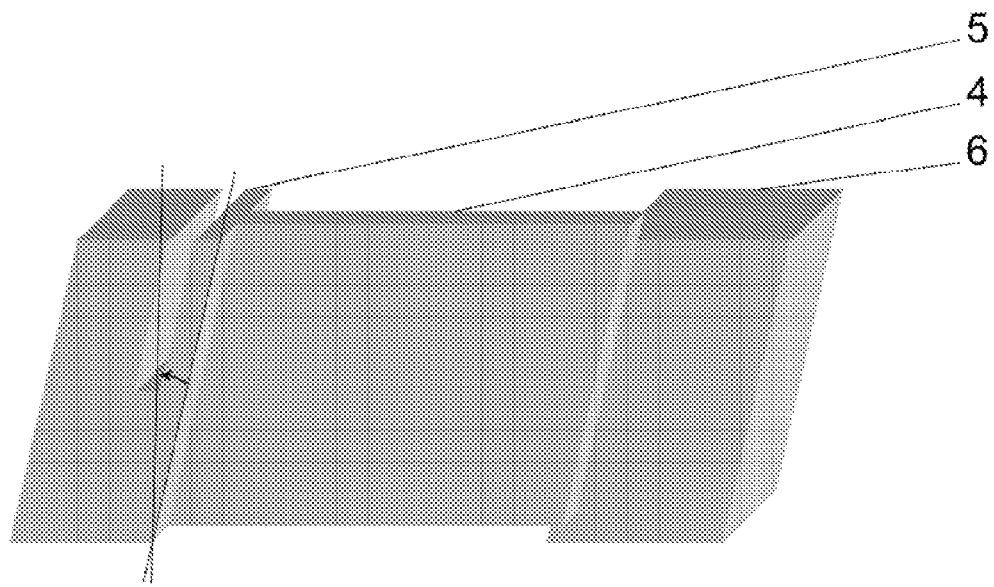
FIG. 6 shows a perspective view of a third alternative spring structure used in supporting the seismic mass of a vibrating sensor of angular velocity according to the invention.

FIG. 6 shows a perspective view of a third alternative spring structure used in supporting the seismic mass of a vibrating sensor of angular velocity according to the invention. The third alternative spring structure of the sensor of angular velocity according to the invention is depicted with the numeral 4. The third alternative spring structure according to the invention comprises attachment spots 5, 6. One or more compensation groove or compensation cavity have been etched into at least one attachment spot 5, 6 of the spring structure 4. The third alternative spring structure 4 according to the invention is asymmetrical such that the coupling, conveyed by the spring, from one mode of motion to another cancels or significantly alleviates the coupling caused by non-ideality due to the quadrature signal.

Figure 7:
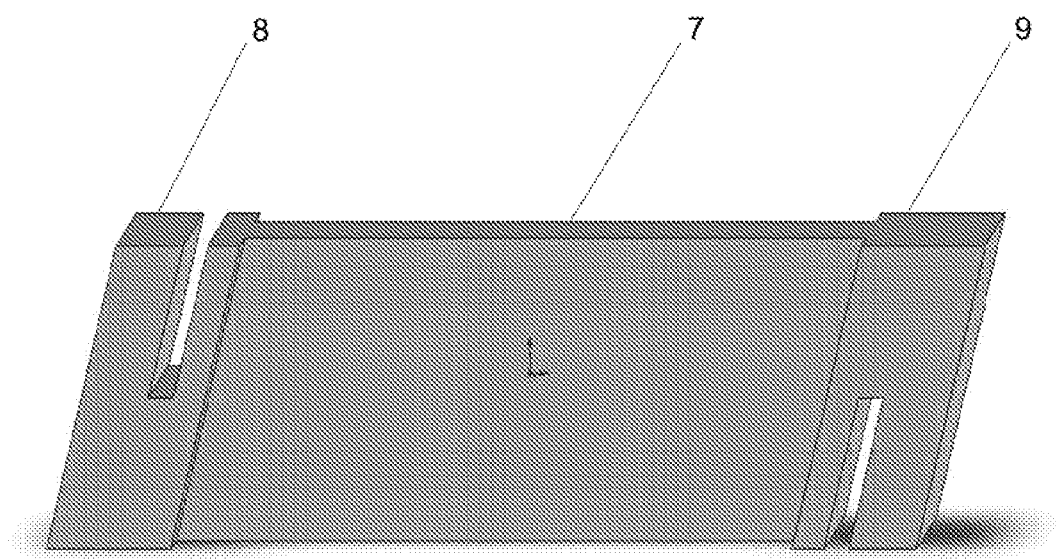
FIG. 7 shows a perspective view of a fourth alternative spring structure used in supporting the seismic mass of a vibrating sensor of angular velocity according to the invention.

FIG. 7 shows a perspective view of a fourth alternative spring structure used in supporting the seismic mass of a vibrating sensor of angular velocity according to the invention. The fourth alternative spring structure of the sensor of angular velocity according to the invention is depicted with the numeral 7. The fourth alternative spring structure 7 according to the invention comprises attachment spots 8, 9. One or more compensation groove or compensation cavity have been etched into both attachment spots 8, 9 of the spring structure 7. The fourth alternative spring structure 7 according to the invention is asymmetrical such that the coupling, conveyed by the spring, from one mode of motion to another cancels or significantly alleviates the coupling caused by non-ideality due to the quadrature signal.

In manufacturing the presented spring structures 4, 7, shown in FIGS. 6-7, the etching mask can be designed such that it compensates for non-idealities occurring over the disk caused by the manufacturing process. One of these non-idealities is, for example, the non-ideality caused by the inclination of the DRIE etching process groove in relation to the normal to the disk. Thus, the dimensioning of the compensation grooves or compensation cavities of the presented spring structures 4, 7 varies over the disk.

The compensation grooves or compensation cavities of the spring structures 4, 7 shown in FIGS. 6-7 can be etched in the same DRIE etching as the other structures. In manufacturing of the presented spring structures 4, 7, due to the ARDE effect, the compensation grooves or compensation cavities would not be etched all the way through the disk, but rather, the depth of the grooves or cavities can be suitably dimensioned. Alternatively, a groove of suitable depth can, for example, be etched by means of a two-stage etching process. In the presented spring structures 4, 7, suitably dimensioned compensation grooves or compensation cavities effectively straighten the end portion of a skewed spring.

Figure 8:
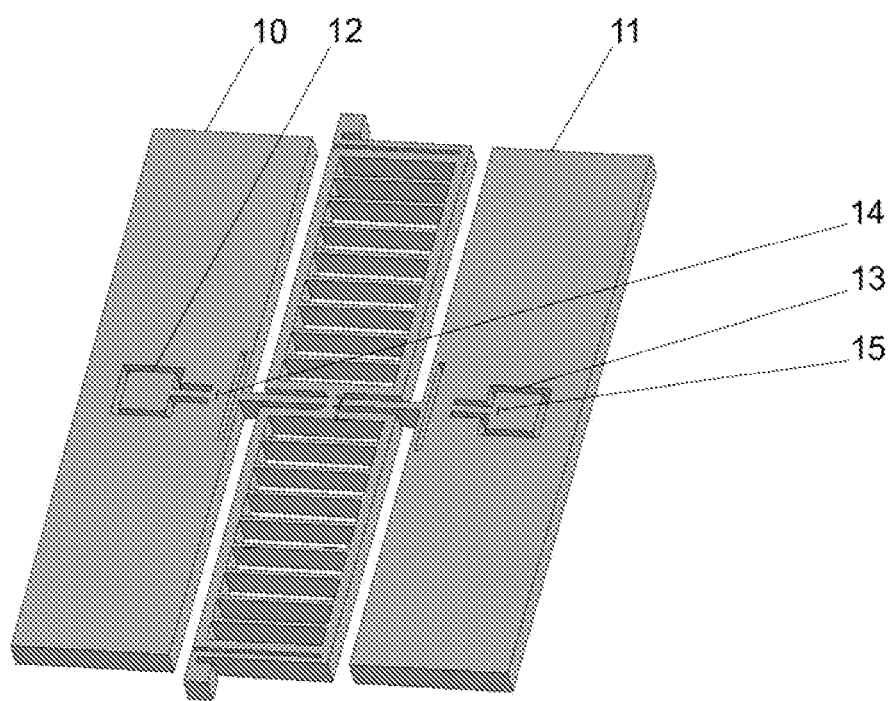
FIG. 8 shows a perspective view of the structure of a vibrating sensor of angular velocity according to the invention.

FIG. 8 shows a perspective view of the structure of a vibrating sensor of angular velocity according to the invention. The vibrating masses of the sensor of angular velocity according to the invention are depicted with the numerals 10 and 11. The masses 10, 11 of the sensor of angular velocity are supported at their attachment spots 12, 13 by means of spring structures. At the opposite end 14 at the mass side of the attachment spot 12 of the spring structure of the sensor of angular velocity or, alternatively, at the end 15 at the attachment spot 13 side of the spring structure, one or more compensation grooves or compensation cavities 14, 15 are etched. The spring structure of the invention is asymmetrical such that the coupling, conveyed by the spring, from one mode of motion to another cancels or significantly alleviates the coupling caused by non-ideality due to the quadrature signal.

Figure 9:
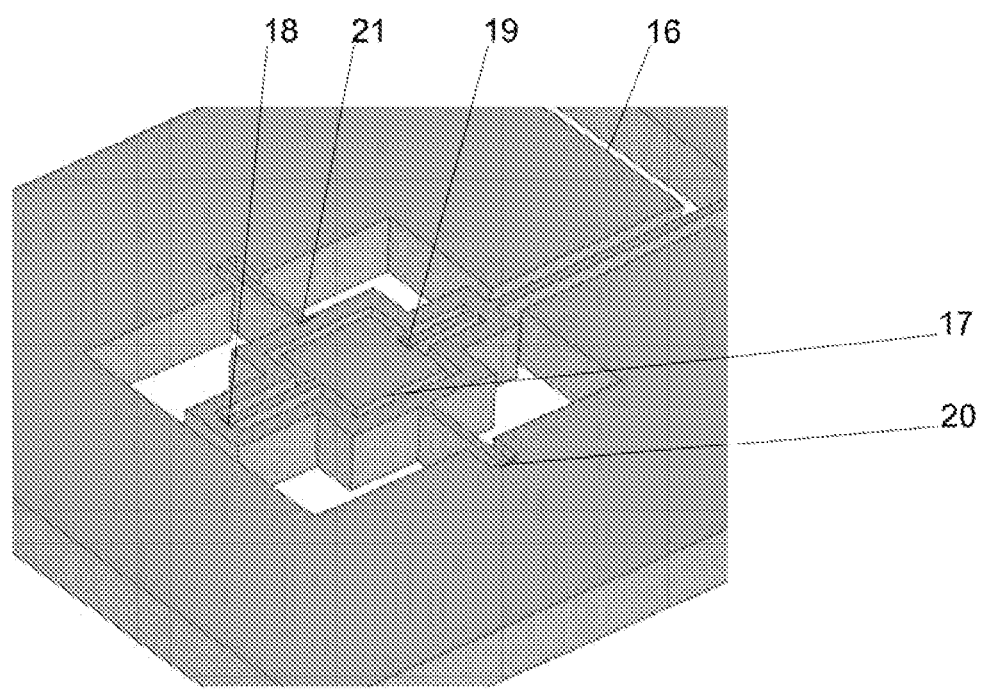
FIG. 9 shows a perspective view of the structure of a vibrating sensor of angular velocity with two axes according to the invention.

FIG. 9 shows a perspective view of the structure of a vibrating sensor of angular velocity with two axes according to the invention. The vibrating mass of the sensor of angular velocity with two axes according to the invention is depicted with the numeral 16. The mass 16 of the sensor of angular velocity with two axes is supported at its attachment spot 17 by means of spring structures. At the ends 18, 20 of the spring structure of the sensor of angular velocity with two axes, opposite to the attachment spot 17, or, alternatively, at the ends 19, 21 at the attachment spot 17 side of the spring structure, one or two compensation grooves or compensation cavities 18-21 are etched. The spring structure of the invention is asymmetrical such that the coupling, conveyed by the spring, from one mode of motion to another cancels or significantly alleviates the coupling caused by non-ideality due to the quadrature signal.

Figure 10:
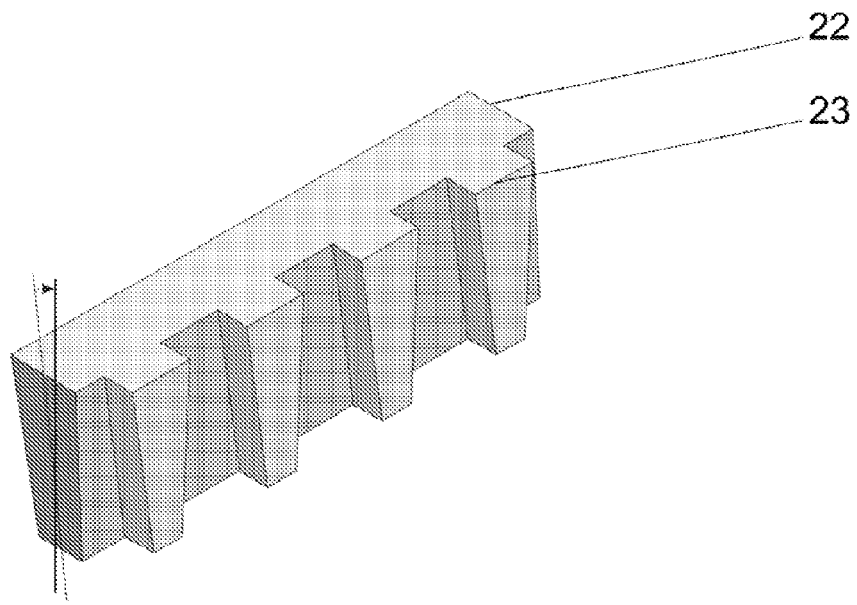
FIG. 10 shows a perspective view of a fifth alternative spring structure used in supporting the seismic mass of a vibrating sensor of angular velocity according to the invention.

FIG. 10 shows a perspective view of a fifth alternative spring structure used in supporting the seismic mass of a vibrating sensor of angular velocity according to the invention. The fifth alternative spring structure of the sensor of angular velocity according to the invention is depicted with the numeral 22. One edge of the fifth alternative spring structure 22 according to the invention is serrated 23. The fifth alternative spring structure 22 according to the invention is asymmetrical such that the coupling, conveyed by the spring, from one mode of motion to another cancels or significantly alleviates the coupling caused by non-ideality due to the quadrature signal.

In manufacturing the fifth alternative spring structure 22 according to the invention, shown in FIG. 10, the etching mask can be designed such that it compensates for non-idealities occurring over the disk, caused by the manufacturing process. One of these non-idealities is, for example, the non-ideality caused by the inclination, in relation to the normal to the disk, of the DRIE etching process groove. Thus, the dimensioning of the serration 23 of the fifth alternative spring structure 22 according to the invention varies over the disk. The serration 23 of the fifth alternative spring structure 22 according to the invention can be etched in the same DRIE etching as the other structures.

Figure 11:
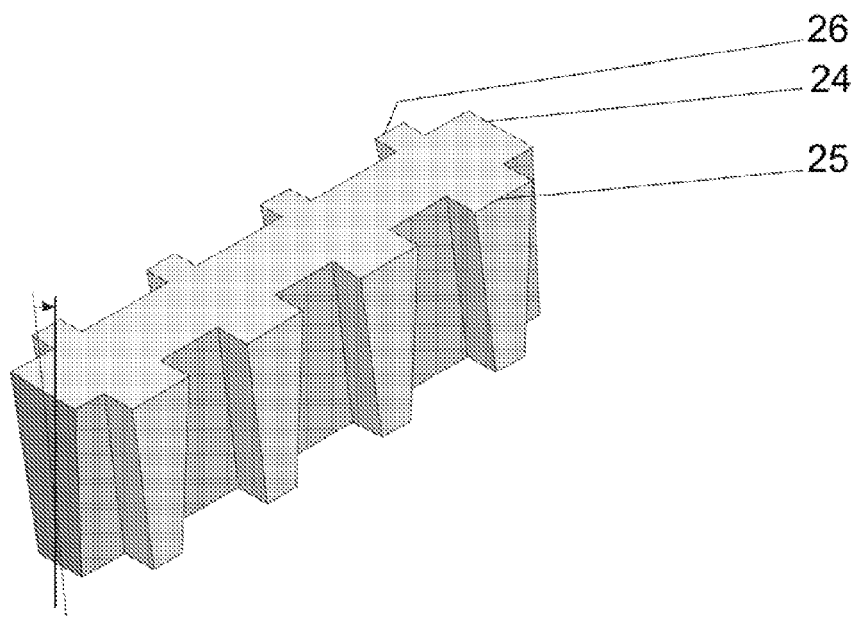
FIG. 11 shows a perspective view of a sixth alternative spring structure used in supporting the seismic mass of a vibrating sensor of angular velocity according to the invention.

FIG. 11 shows a perspective view of a sixth alternative spring structure used in supporting the seismic mass of a vibrating sensor of angular velocity according to the invention. The sixth alternative spring structure of the sensor of angular velocity according to the invention is depicted with the numeral 24. Both edges of the sixth alternative spring structure 24 according to the invention are serrated 25, 26. The sixth alternative spring structure 24 according to the invention is asymmetrical such that the coupling, conveyed by the spring, from one mode of motion to another cancels or significantly alleviates the coupling caused by non-ideality due to the quadrature signal.

In manufacturing the sixth alternative spring structure 24 according to the invention, shown in FIG. 11, the etching mask can be designed such that it compensates for non-idealities occurring over the disk caused by the manufacturing process. One of these non-idealities is, for example, the non-ideality caused by the inclination of the DRIE etching process groove in relation to the normal to the disk. Thus, the dimensioning of the serrations 25, 26 of the sixth alternative spring structure 24 according to the invention varies over the disk. The serrations 25, 26 of the sixth alternative spring structure 24 according to the invention can be etched in the same DRIE etching as the other structures.

The DRIE etching profile in the spring structures 22, 24 shown in FIGS. 10-11 is, in practice, in addition to the inclination, slightly wedge-shaped, i.e. the grooves widen in the depth direction, whereby the serration patterns differ between the upper and lower surfaces of the spring. In the solution according to the invention, the serration 23, 25, 26 can be suitably dimensioned to be one-sided or asymmetrical, whereby the serration 23, 25, 26 twists the bending axis of the spring 22, 24.

The solution according to the invention can be used for compensating for the quadrature signal of all such sensors of angular velocity, in which the primary motion is a vibration of at least one seismic mass and an associated moving electrode, and in which the mass, in addition to the primary motion, possesses a second degree of freedom in relation to a detection axis, or detection axes, essentially perpendicular to the primary motion.

We claim:

1. A vibrating micromechanical sensor of angular velocity, comprising:
    at least one seismic mass;
    and an associated moving electrode,
    wherein the at least one seismic mass possesses a primary motion, into which it has to be activated, and, in addition to the primary motion, at least one degree of freedom in relation to a detection axis, or detection axes, essentially perpendicular to the primary motion,
    wherein the at least one seismic mass is supported to a frame of a sensor component by a spring structure, and
    wherein a quadrature signal, caused by the sensor, is adjusted to a desired level by a mechanical signal.

2. The sensor of angular velocity according to claim 1, wherein a corner is etched off the spring structure.

3. The sensor of angular velocity according to claim 1, wherein one or more compensation grooves are etched into the spring structure.

4. The sensor of angular velocity according to claim 1, wherein one or more compensation cavities are etched into the spring structure.

5. The sensor of angular velocity according to claim 1, wherein one or more compensation grooves or compensation cavities are etched into at least one attachment spot of the spring structure.

6. The sensor of angular velocity according to claim 5, wherein the compensation grooves or compensation cavities are suitably dimensioned, such that they effectively straighten the end portion of a skewed spring.

7. The sensor of angular velocity according to claim 1, wherein one of the edges of the spring structure is serrated.

8. The sensor of angular velocity according to claim 1, wherein both edges of the spring structure are serrated.

9. The sensor of angular velocity according to claim 7, wherein the serration is suitably dimensioned to be one-sided or asymmetrical, such that the serration twists the bending axis of the spring.

10. The sensor of angular velocity according to claim 1, wherein the spring structure is asymmetrically designed such that the coupling from one mode of motion to another, conveyed by the spring, cancels or alleviates the coupling caused by a non-ideality due to the inclination of the groove of an etching process relative to a normal to a disk of the sensor component.

11. The sensor of angular velocity according to claim 10, wherein the etching process is a DRIE (DRIE, Deep Reactive Ion Etching) etching process.

12. The sensor of angular velocity according to claim 1, wherein the quadrature signal, caused by the sensor, is also adjusted to the desired level by an electrical signal.

13. A method for the manufacturing of a vibrating micromechanical sensor of angular velocity by micromechanical disk structures, wherein the sensor of angular velocity comprises at least one seismic mass and an associated moving electrode, wherein the at least one seismic mass possesses a primary motion, into which it has to be activated, and, in addition to the primary motion, at least one degree of freedom in relation to a detection axis, or detection axes, essentially perpendicular to the primary motion, wherein the at least one seismic mass is supported to a frame of a sensor component by a spring structure, and wherein a quadrature signal, caused by the sensor, is adjusted to a desired level by a mechanical signal.

14. The method according to claim 13, wherein the etching mask is designed such, that it compensates for non-idealities occurring over the disk, caused by the manufacturing process.

15. The method according to claim 13, wherein a DRIE etching technique (DRIE, Deep Reactive Ion Etching) is being used in the manufacturing.

16. The method according to claim 13, wherein, in manufacturing, non-idealities of the DRIE (DRIE, Deep Reactive Ion Etching) etching process, such as the ARDE effect (ARDE, Aspect Ratio Dependent Etch rate), are being utilized.

17. The method according to claim 13, wherein, in manufacturing, a two-stage DRIE (DRIE, Deep Reactive Ion Etching) etching process is being utilized, by which the depth of a groove, or a cavity, to be etched can be suitably dimensioned.

18. The method according to claim 13, wherein the spring structure is asymmetrically designed such that the coupling from one mode of motion to another, conveyed by the spring, cancels or alleviates the coupling caused by a non-ideality due to the inclination of the groove of an etching process relative to a normal to a disk of the sensor component.

19. The method according to claim 18, wherein the etching process is a DRIE (DRIE, Deep Reactive Ion Etching) etching process.

20. The method according to claim 13, wherein the quadrature signal, caused by the sensor, is also adjusted to the desired level by an electrical signal.

* * * * *